United States Patent
Manita (10) Patent No.: US 9,372,639 B2
(45) Date of Patent: Jun. 21, 2016

(54) SYSTEM LSI CAPABLE OF ERASING INTERNALLY STORED PROGRAM AND PROGRAM ERASING METHOD

(71) Applicant: CASIO COMPUTER CO., LTD., Shibuya-ku, Tokyo (JP)

(72) Inventor: Hiroshi Manita, Sayama (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 274 days.

(21) Appl. No.: 13/919,892

(22) Filed: Jun. 17, 2013

(65) Prior Publication Data

US 2014/0032870 A1  Jan. 30, 2014

(30) Foreign Application Priority Data

Jul. 24, 2012  (JP) .................................. 2012-163356

(51) Int. Cl.
| | |
|---|---|
| *G06F 12/00* | (2006.01) |
| *G06F 3/06* | (2006.01) |
| *G06F 21/76* | (2013.01) |
| *G06F 21/75* | (2013.01) |

(52) U.S. Cl.
CPC ............ *G06F 3/0652* (2013.01); *G06F 3/0604* (2013.01); *G06F 3/0673* (2013.01); *G06F 21/75* (2013.01); *G06F 21/76* (2013.01); *G06F 2221/2143* (2013.01)

(58) Field of Classification Search
CPC ... G06F 3/0614; G06F 3/0652; G06F 3/0688; G06F 12/0246; G06F 12/14; G06F 12/127

USPC .......................... 711/154, 166; 714/47.2, 721; 365/185.25, 185.29, 185.33, 218; 369/13.04
See application file for complete search history.

(56) References Cited

U.S. PATENT DOCUMENTS

| | | | | | |
|---|---|---|---|---|---|
| 3,761,892 | A | * | 9/1973 | Bosnyak ............ | G07C 9/00182 235/382 |
| 4,336,465 | A | * | 6/1982 | Nakano ................ | G11C 7/1048 327/198 |
| 4,783,763 | A | * | 11/1988 | Bergman ......... | H03K 19/17708 326/38 |

(Continued)

FOREIGN PATENT DOCUMENTS

| | | |
|---|---|---|
| JP | 06067985 A | 3/1994 |
| JP | 2008219058 A | 9/2008 |
| JP | 4191170 B2 | 12/2008 |

OTHER PUBLICATIONS

Choe et al., "P_Channel Nonvolatile Flash Memory With a Dopant-Segregated Schottky-Barrier Source/Drain", Aug. 2010, IEEE Transations on Electron Devices, vol. 57, No. 8, pp. 1737-1742.*

(Continued)

*Primary Examiner* — Reba I Elmore
(74) *Attorney, Agent, or Firm* — Holtz, Holtz & Volek PC (57) ABSTRACT

The present invention provides a system LSI that integrates, on a single semiconductor, a logic circuit, a CPU, and a program memory storing a program of the CPU. The system LSI includes a program eraser erasing contents stored in the program memory, and at least two program erasing trigger terminals controlling execution of the program eraser. The program eraser erases a program stored in the program memory on the basis of potentials of the two program erasing trigger terminals.

8 Claims, 7 Drawing Sheets

(56) References Cited

U.S. PATENT DOCUMENTS

| | | | | |
|---|---|---|---|---|
| 4,933,898 | A * | 6/1990 | Gilberg | G06F 21/86 257/659 |
| 5,485,105 | A * | 1/1996 | Harward | G11C 17/18 326/38 |
| 5,497,462 | A * | 3/1996 | Schrenk | 714/700 |
| 5,696,717 | A * | 12/1997 | Koh | 365/185.22 |
| 5,784,319 | A * | 7/1998 | Villa et al. | 365/185.33 |
| 5,822,244 | A * | 10/1998 | Hansen et al. | 365/185.11 |
| 5,986,967 | A * | 11/1999 | Furumochi | G11C 11/413 365/233.1 |
| 6,159,836 | A * | 12/2000 | Wei | H01L 23/5252 257/E23.147 |
| 6,177,714 | B1 * | 1/2001 | Nagai | H01L 23/5258 257/529 |
| 6,202,123 | B1 * | 3/2001 | Mukai et al. | 711/103 |
| 6,208,558 | B1 * | 3/2001 | Chen et al. | 365/185.18 |
| 6,421,757 | B1 * | 7/2002 | Wang et al. | 711/103 |
| 6,577,538 | B2 * | 6/2003 | Atsumi | G11C 16/16 365/185.23 |
| 7,002,219 | B1 * | 2/2006 | de Jong | H01L 23/5256 257/357 |
| 7,570,532 | B1 * | 8/2009 | Lloyd | 365/210.14 |
| 7,613,931 | B2 * | 11/2009 | Tonami | G06F 21/76 380/201 |
| 2002/0191383 | A1 * | 12/2002 | Corisis et al. | 361/784 |
| 2003/0074637 | A1 * | 4/2003 | Pavesi et al. | 716/1 |
| 2003/0151426 | A1 * | 8/2003 | Islam | H03K 19/00323 326/37 |
| 2003/0155928 | A1 * | 8/2003 | Roden | B60L 3/0061 324/509 |
| 2004/0245617 | A1 * | 12/2004 | Damberg et al. | 257/686 |
| 2005/0114613 | A1 * | 5/2005 | Otani | G11C 5/04 711/154 |
| 2006/0020907 | A1 * | 1/2006 | Tonami | G06F 21/76 717/100 |
| 2007/0189089 | A1 * | 8/2007 | Chen | 365/203 |
| 2007/0258306 | A1 * | 11/2007 | Riekels et al. | 365/222 |
| 2012/0037027 | A1 * | 2/2012 | Nelson | F42C 15/40 102/215 |
| 2012/0055951 | A1 * | 3/2012 | Herman | B05C 17/0103 222/1 |
| 2012/0216079 | A1 * | 8/2012 | Fai et al. | 714/42 |
| 2012/0239858 | A1 * | 9/2012 | Melik-Martirosian | 711/103 |

OTHER PUBLICATIONS

Japanese Office Action dated May 20, 2014 in counterpart Japanese Application No. 2012-163356.

* cited by examiner

SYSTEM LSI CAPABLE OF ERASING INTERNALLY STORED PROGRAM AND PROGRAM ERASING METHOD

CROSS-REFERENCE TO RELATED APPLICATION

This application claims the benefit of Japanese Patent Application No. 2012-163356, filed on Jul. 24, 2012, the entire disclosure of which is incorporated by reference herein.

FIELD

This application relates, in a system LSI (Large-Scale Integrated Circuit) which integrates, on a single semiconductor, a logic circuit, a CPU (Central Processing Unit), and a program memory storing a program of the CPU, to a technique of preventing an illegal copy of a program stored in the system LSI.

BACKGROUND

In recent years, a system LSI (such as an ASIC (Application Specific Integrated Circuit), and an FPGA (Field-Programmable Gate Array)) which integrates, on a single semiconductor, a logic circuit, a CPU, and a program memory storing a program of the CPU has been actively developed.

A system LSI is a core portion of an electronic device in which the system LSI is assembled, and a technique of disassembling and analyzing the system LSI is progressing.

However, in recent years, such progress of an analysis technique of a system LSI has been abused and a system of dead-copying (imitating) the circuit of a system LSI is often seen. To prevent such an imitation of a system LSI, an FPGA technique for preventing an analysis and a dead copy of a system LSI has been proposed (for example, refer to Japanese Patent No. 4,191,170).

In the FPGA technique, a system LSI is provided with the FPGA, a ROM (Read Only Memory) storing user circuit data and a start key code string, and a gate array exclusive for a user in which a start key information is assembled in advance. The gate array exclusive for a user boots the FPGA by data of a user circuit in the case that the information derived from the start key code string matches the start key information. Accordingly, in the system LSI, a person holding a gate array exclusive for users provided with a correct start key information is allowed to perform the operation of the system, but a person not holding a gate array exclusive for users provided with a correct start key information is prohibited from performing the operation.

In the FPGA technique, however, to prevent a dead copy by analyzing the system LSI, a dedicated gate array has to be prepared in addition to the FPGA, and there is a problem that a manufacturing cost increases.

When the dedicated gate array is imitated by analyzing the inside of the dedicated gate array, there is a problem that the system LSI itself is dead-copied.

SUMMARY

An object of the present invention is to provide a technique of preventing an illegal copy of a program stored in a system LSI which integrates, on a single semiconductor, a logic circuit, a CPU, and a program memory storing a program of the CPU.

A system LSI according to an aspect of the present invention is a system LSI which integrates, on a single semiconductor, a logic circuit, a CPU, and a program memory storing a program of the CPU, and includes:

a program eraser erasing the contents stored in the program memory; and at least two program erasing trigger terminals controlling the execution by the program eraser.

The program eraser erases the program stored in the program memory on the basis of a potential of the two program erasing trigger terminals.

Preferably, the two program erasing trigger terminals are short-circuited by a short bar in the system LSI.

Preferably, the short bar is thermally cut by a reflow performed to mount the system LSI on a printed wiring board.

Preferably, one of the two program erasing trigger terminals is set to a VDD potential in the system LSI and the other terminal is connected to a ground and the program eraser inside the system LSI.

Preferably, the program eraser includes an inputter for controlling the execution of the program erasure, and the program eraser does not execute a program erasing operation when the potential of the inputter is a potential other than a ground, and executes the program erasing operation when the potential of the inputter is the ground.

Preferably, the inputter is connected to one of the two program erasing trigger terminals.

Preferably, an integration circuit disposed inside the system LSI is assembled in one of the two program erasing trigger terminals.

Preferably, the system LSI is mounted in the form of a BGA (Ball Grid Array) package.

Preferably, the two program erasing trigger terminals are set as terminals disposed in a region on the inside of a range surrounded by the terminals in the second rows from an outside in the BGA package.

According to the present invention, an illegal copy of a program stored in a system LSI which integrates, on a single semiconductor, a logic circuit, a CPU, and a program memory storing a program of the CPU is prevented.

BRIEF DESCRIPTION OF THE DRAWINGS

A more complete understanding of this application will be obtained when the following detailed description is considered in conjunction with the following drawings, in which.

DETAILED DESCRIPTION

First Embodiment

An embodiment of the present invention of a technique of preventing an illegal copying of a program stored in a program memory in a system LSI according to the present embodiment which integrates, in a single semiconductor, a logic circuit, a CPU, and the program memory storing the program which is operated by the CPU will be described with reference to the drawings.

To analyze a program stored in a system LSI mounted on a PCB, the system LSI is detached from the PCB and housed in a dedicated tester, or probing is performed. As a means of preventing such an illegal act, a forced erasing of the program is optimum. In such a case, a question of how to trigger a forced erasing of a program is raised. In the embodiment of the present invention, a technique of giving a trigger of a forced erasing of a program by opening predetermined terminals provided for a BGA package will be described.

Figure 1:
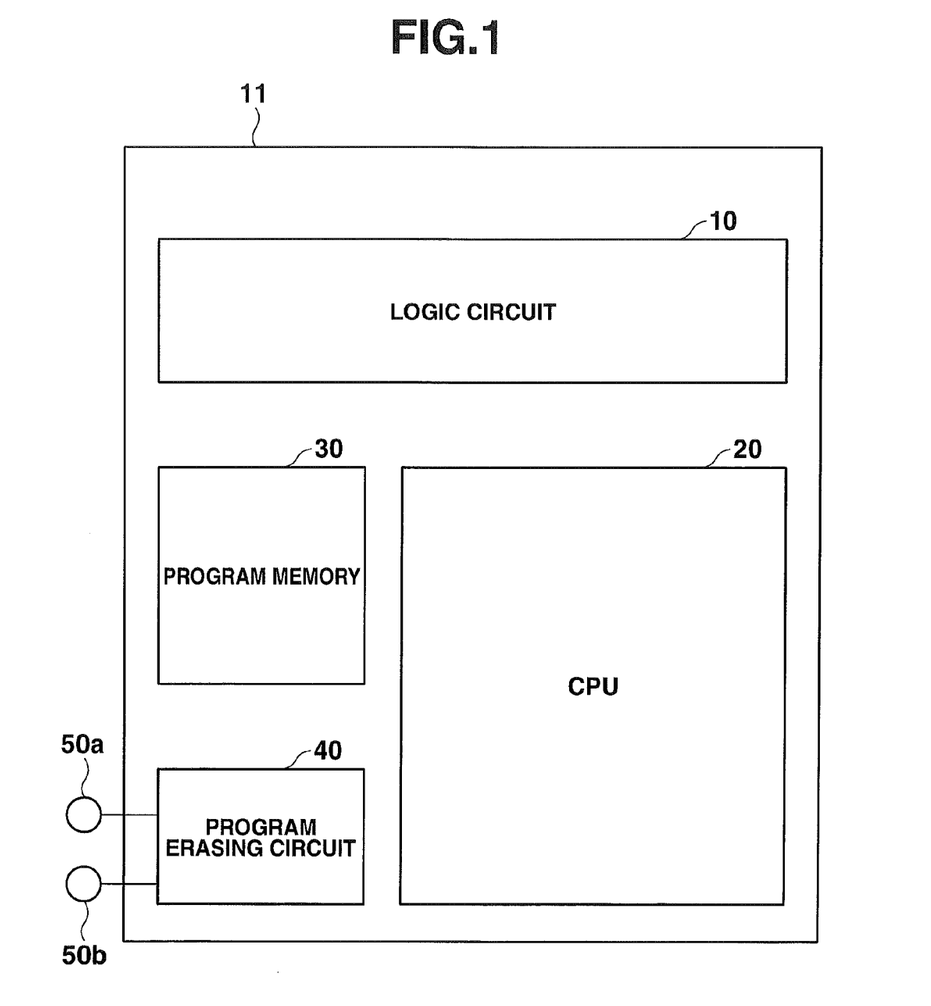
FIG. 1 is a block diagram of a system LSI according to a first embodiment of the present invention.

FIG. 1 is a block diagram of a system LSI_11 as an embodiment of the present invention.

As illustrated in FIG. 1, the system LSI_11 includes a logic circuit 10 comprising a hard-wired logic circuit, a CPU 20 controlling the general operation of the system LSI_11, and a program memory 30 which stores a program for operating the CPU 20 and comprises a nonvolatile memory in which the program is made to be rewritten. Further, the system LSI_11 includes a program erasing circuit 40 which operates so as to erase the contents in the program memory 30 in response to a predetermined trigger, and program erasing trigger terminals 50a and 50b which function as a trigger on the program erasing circuit 40.

The CPU 20 performs various computing processes, a control of the logic circuit 10 and the like in accordance with a program stored in the program memory 30, and makes an electronic device in which the system LSI_11 is assembled realize various functions.

The program erasing circuit 40 erases the program stored for making the program memory 30 operate the CPU 20 on the basis of the potential state of the program erasing trigger terminals 50a and 50b. As a method of erasing the program, both a resetting method of forcedly writing "FF" or "00" in all of the regions of the program memory 30 and a method of erasing the program by writing a generated random number are applicable.

Figure 2:
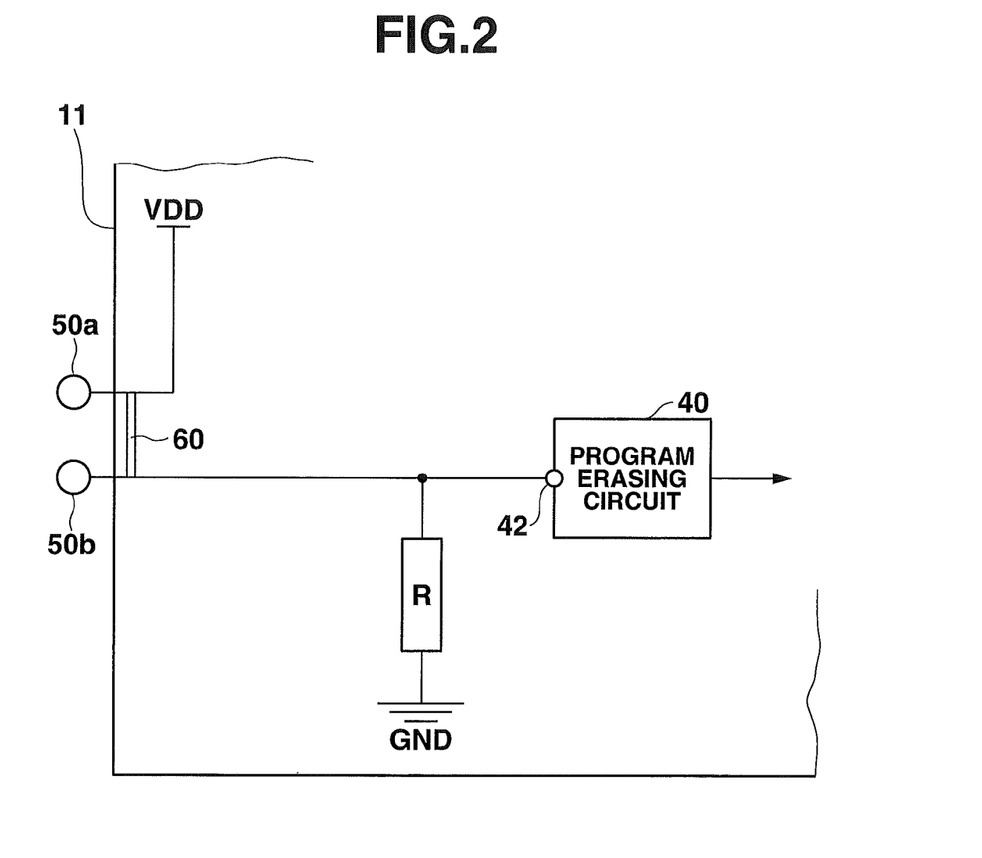
FIG. 2 is a diagram illustrating a connection state of two program erasing trigger terminals provided for the system LSI according to the first embodiment.

FIG. 2 is a circuit diagram illustrating a connection state of two program erasing trigger terminals 50a and 50b of the system LSI_11.

As illustrated in FIG. 2, the program erasing trigger terminals 50a and 50b are short-circuited by a short bar 60 inside the system LSI_11 at the time of manufacturing the system LSI_11. The short bar 60 will be described in detail later.

The program erasing trigger terminal 50a is provided in the system LSI_11 and is connected to a terminal VDD of which potential may be VDD [mV]. Moreover, the program erasing trigger terminal 50a is connected to a terminal GND via the short bar 60 and a resistor R. On the other hand, the program erasing trigger terminal 50b is provided in the system LSI_11 and is connected to the terminal GND of which potential becomes ground potential (0 [mV]) via the resistor R. Moreover, the program erasing trigger terminal 50b is connected to an inputter 42 of the program erasing circuit 40. Further, as long as the effects of the present invention are obtained, the number of the program erasing trigger terminals is not limited to two but can be three or more.

The program erasing circuit 40 does not operate when the inputter 42 is connected to the terminal VDD and the potential of the inputter 42 is VDD [mV] (VDD: positive or negative potential other than GND (ground potential)). On the other hand, the program erasing circuit 40 operates so as to execute an erasure of the program memory 30 when the inputter 42 is connected to the terminal GND and the potential of the inputter 42 becomes the ground potential (=0 [mV]). Consequently, in a state where the program erasing trigger terminals 50a and 50b are short-circuited by the short bar 60, the potential of the inputter 42 of the program erasing circuit 40 is VDD [mV], being the same as that of the terminal VDD, so that the program erasing circuit 40 does not operate.

Figure 3:
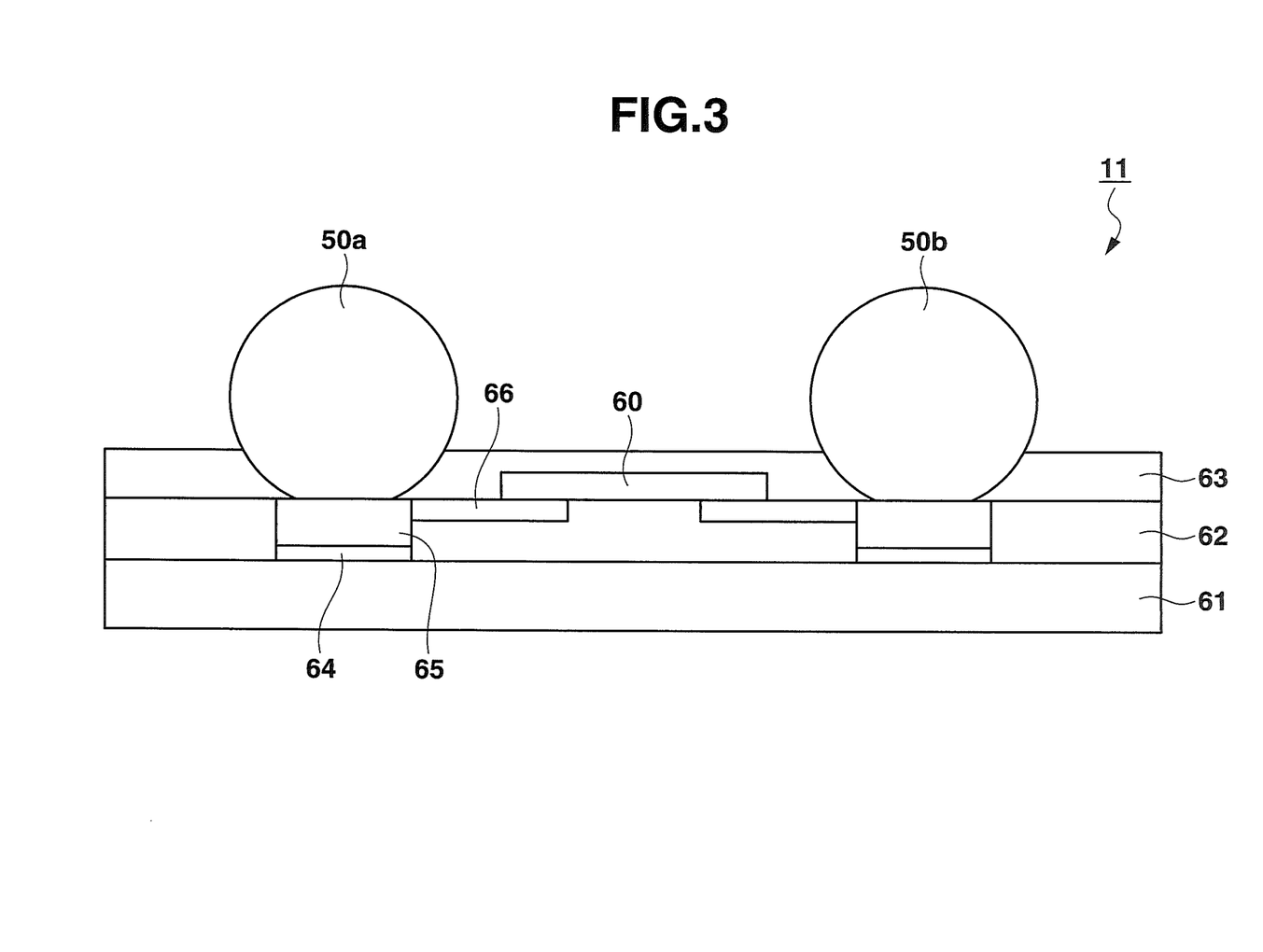
FIG. 3 is a diagram illustrating a surface portion of the system LSI according to the first embodiment.

FIG. 3 is a diagram illustrating the surface portion of the system LSI_11 in detail.

As illustrated in FIG. 3, a solder resist 62 is applied onto a silicon substrate 61 and, further, the solder resist 62 is protected with a passivation film 63. The passivation film 63 is made of polyimide. An LSI pad 64 is disposed on the silicon substrate 61, and the LSI pad 64 and a short pattern 66 are surrounded by the solder resist 62. The short bar 60 is formed on the short pattern 66 and the solder resist 62 so as to connect the short pattern 66 which is disconnected in some midpoint. Over the two LSI pads 64, solder balls as the two program erasing trigger terminals 50a and 50b are mounted. Here, the system LSI_11 is mounted on the silicon substrate 61 in the form of a BGA (Ball Grid Array) package. In the BGA package, the program erasing trigger terminals 50a and 50b are formed of the solder balls.

At a manufacturing stage of the system LSI_11 or at the time of writing a program using a program writing device into the program memory 30, the program erasing trigger terminals 50a and 50b have to be short-circuited in the system LSI_11. For this purpose, in the first embodiment, the short bar 60 is disposed in the surface portion of the system LSI_11 as illustrated in FIG. 3. Moreover, below the solder balls constructing the program erasing trigger terminals 50a and 50b, UBM (Under Bump Metals) 65 are formed. After that, the small short pattern 66 which is disconnected in some midpoint is formed so as to be laid across the program erasing trigger terminals 50a and 50b. With the short pattern 66, a physical interference with the solder balls (program erasing trigger terminals 50a and 50b) from the outside is prevented, and a failure such as a void caused by the interference is avoided. The short pattern 66 is formed of an Au wiring pattern by rewiring at the same time with a formation of the UBM 65. A tin (Sn) is thinly formed in a band shape by printing so as to be laid across the short patterns 66 disconnected in some midpoint, thereby forming the short bar 60 as illustrated in FIG. 3. After that, polyimide is applied so as to cover the short bar 60, thereby forming a protection layer (passivation film 63) as illustrated in FIG. 3.

Moreover, in a PCB (Print Wiring Board) 70 mounting the system LSI_11, a wiring pattern 72 (refer to FIG. 4) for short-circuiting the program erasing trigger terminals 50a and 50b is formed in advance.

As described above, the program erasing trigger terminals 50a and 50b in the system LSI_11 are short-circuited by the short bar 60 in the system LSI_11. Consequently, when a power is supplied to a program writing device in which the system LSI_11 is installed, the potential of the inputter 42 (refer to FIG. 2) of the program erasing circuit 40 becomes VDD [mV] which is the same as the potential VDD [mV] of the terminal VDD. As a result, the program erasing circuit 40 does not operate, so that a writing of a program can be stored into the program memory 30.

The system LSI_11 for which a writing of a program is finished being stored therein is carried to a reflow furnace (not illustrated), goes through a reflow process of the program erasing trigger terminals 50a and 50b (solder balls) in the reflow furnace, and gets mounted on the PCB 70. As described above, the program erasing trigger terminals 50a and 50b are short-circuited (electrically connected) by the short bar 60 in the system LSI_11. Since the melting point of a tin is 232° C., it is preferable to set the reflow temperature in the reflow furnace in the range of over 245° C. and under 265° C. Due to the setting, the short bar 60 obtained by printing a tin is thermally cut by heating in the reflow process at the time of mounting the system LSI_11 on the PCB 70 in the reflow furnace (refer to FIG. 4). Consequently, the connection state of the program erasing trigger terminals 50*a* and 50*b* becomes open (a state of being electrically insulated from each other) in the system LSI_11.

After that, the system LSI_11 is mounted on the PCB 70. As described above, on the PCB 70 on which the system LSI_11 is mounted, the wiring pattern 72 (refer to FIG. 4) for short-circuiting the program erasing trigger terminals 50*a* and 50*b* is formed in advance. Consequently, referring to FIG. 4, when the system LSI_11 is mounted on the PCB 70, the short-circuit of the program erasing trigger terminals 50*a* and 50*b* is secured by the wiring pattern on the PCB 70. Therefore, referring to FIG. 4, even when the system LSI_11 supplies a power to operate an assembled electronic device via the PCB 70, the potential of the inputter 42 of the program erasing circuit 40 is VDD [mV] which is the same as the potential VDD [mV] of the terminal VDD (refer to FIG. 2). Accordingly, the program erasing circuit 40 does not operate. As a result, the electronic device gets normally operated according to the program stored in the program memory 30.

Figure 4:
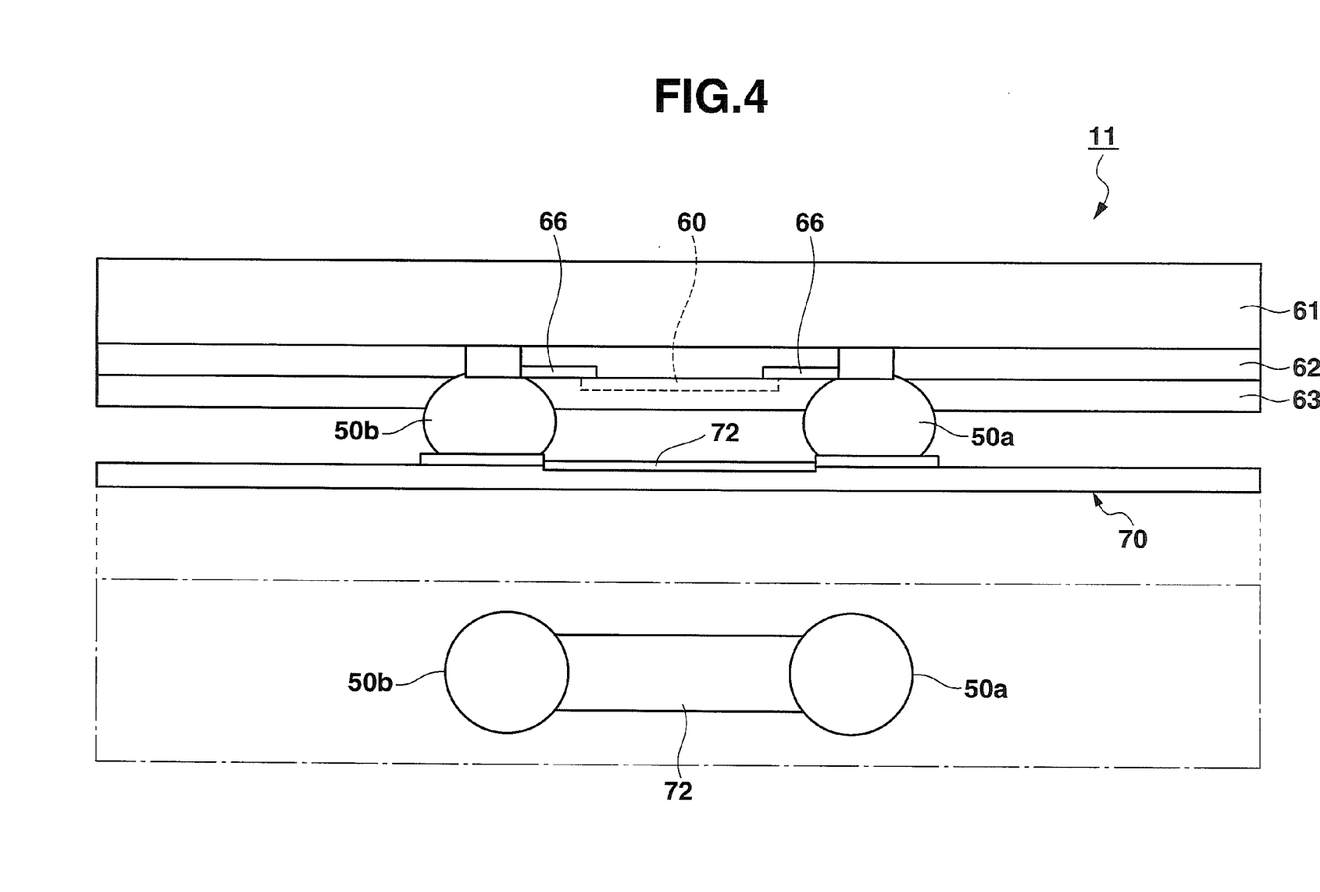
FIG. 4 is a diagram illustrating a state where the system LSI according to the first embodiment is mounted on a PCB (Print Circuit Board)

With reference to FIG. 4, when a third party detaches the system LSI_11 from the PCB 70 in the electronic device holding this PCB in order to analyze the system LSI_11, the short-circuit by the wiring pattern on the PCB 70 is cancelled, and the program erasing trigger terminals 50*a* and 50*b* enter an open state (electrically insulated state). In this state, the program erasing trigger terminal 50*b* is not connected to the terminal VDD but is connected to the terminal GND, and the inputter 42 of the program erasing circuit 40 is connected to the program erasing trigger terminal 50*b*. Consequently, in a state where a current is passed to the system LSI_11 in order to analyze the system LSI_11, the potential of the inputter 42 becomes a ground potential (=0 [mV]). Accordingly, the program erasing circuit 40 executes an operation of erasing the program stored in the program memory 30. As a result, the program in the program memory 30 is erased, and an illegal copy of the program in the system LSI_11 is prevented.

Figure 5:
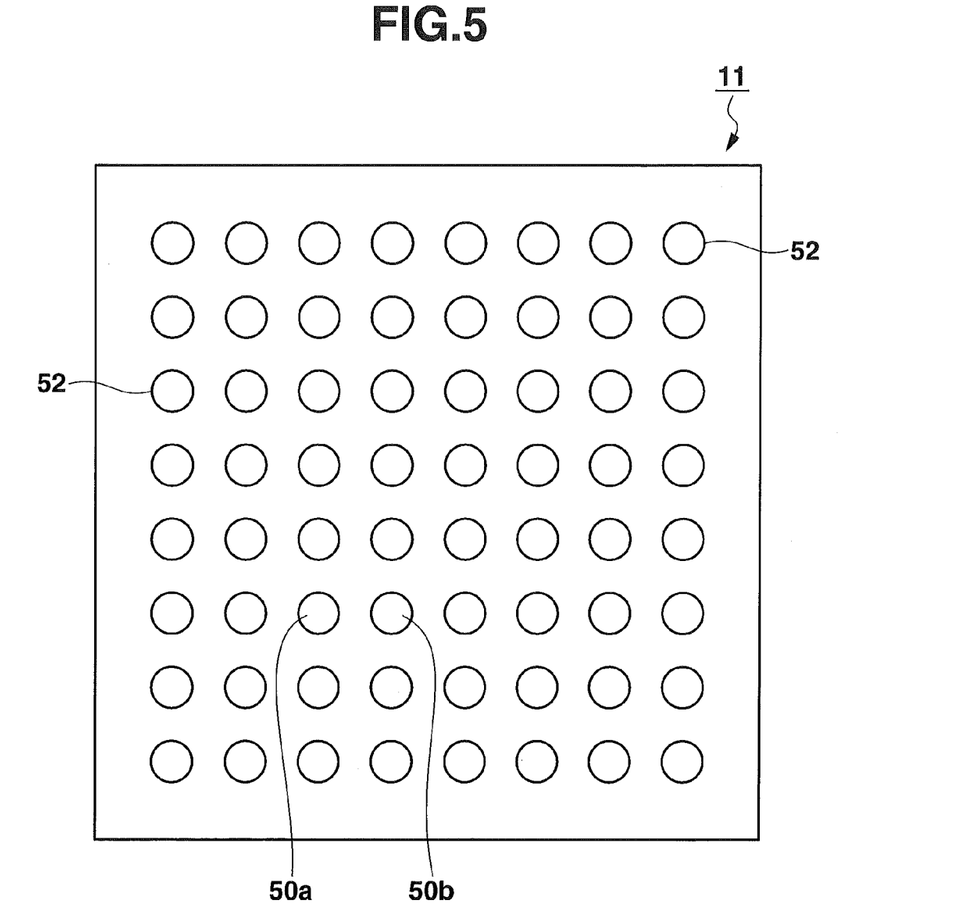
FIG. 5 is a diagram illustrating a disposal state of the terminals of the system LSI according to the first embodiment.

FIG. 5 is a layout drawing of the terminals of the system LSI_11.

As illustrated in FIG. 5, in the system LSI_11, a plurality of the terminals 52 are arranged in a matrix. It is preferable to set the program erasing trigger terminals 50*a* and 50*b* out of the plurality of the terminals 52 as the terminals disposed in a region on the inside of a range surrounded by the terminals 52 in the second rows from the outside of the BGA package in order to prevent the terminals from being operated from the outside when detached from the PCB.

In FIG. 5, the program erasing trigger terminals 50*a* and 50*b* are disposed so as to be adjacent to each other. The present embodiment, however, is not limited to such an arrangement. The program erasing trigger terminals 50*a* and 50*b* do not have to be always adjacent to each other as long as the terminals apart from each other are able to be short-circuited by the short bar 60 in the system LSI_11.

Figure 6:
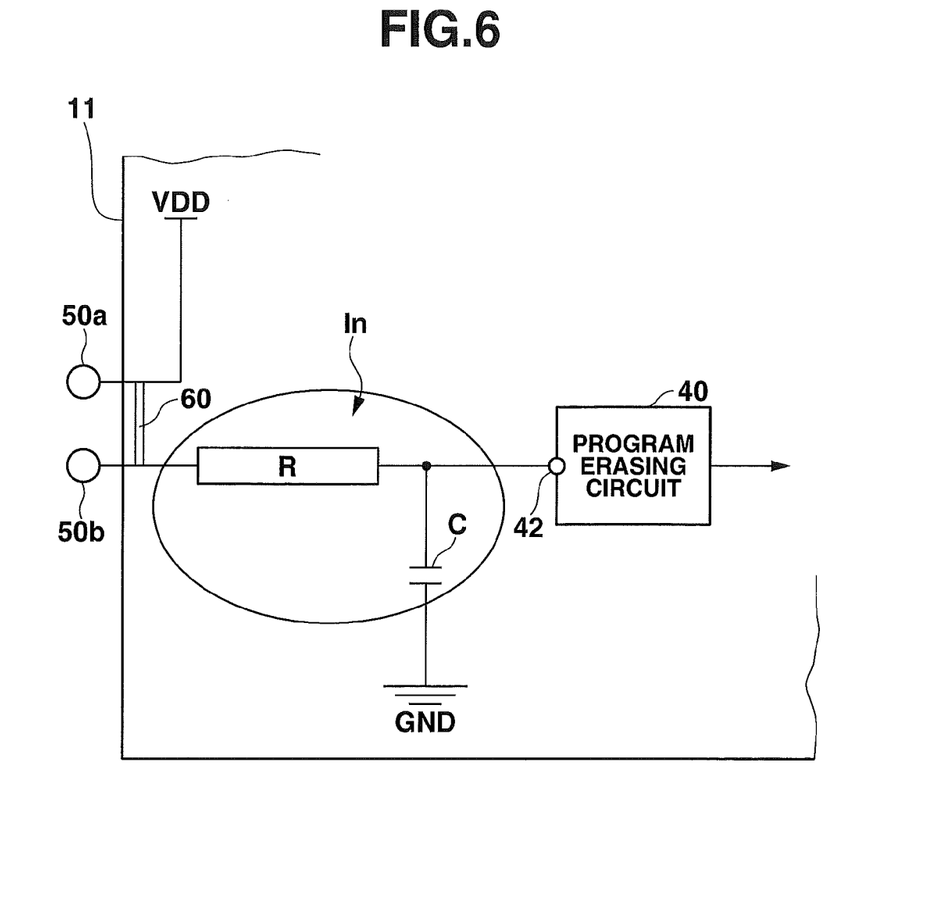
FIG. 6 is a diagram illustrating a state where an integration circuit is assembled in one of the two program erasing trigger terminals provided for the system LSI according to the first embodiment.

As illustrated in FIG. 6, it is preferable to assemble an RC integration circuit In obtained by connecting a resistor R and a capacitor C into the program erasing trigger terminal 50*b*, and preferable to connect the program erasing trigger terminal 50*b* to the inputter 42 of the program erasing circuit 40 via the RC integration circuit In. With the configuration, even in the case where a slight connection failure occurs in the program erasing trigger terminals 50*a* and 50*b* and the program erasing trigger terminals 50*a* and 50*b* are momentarily opened while the system LSI_11 is being assembled into an electronic device holding the PCB 70, by the characteristic of a high-cutoff filter of the RC integration circuit In, the potential of the inputter 42 of the program erasing circuit 40 is held at a positive potential. Thus, an erroneous operation of the program erasing circuit 40 is prevented. Moreover, the RC integration circuit In is disposed in the system LSI_11.

Further, in the first embodiment, a tin is used for the short bar 60 formed in the system LSI_11. The embodiment, however, is not limited to a tin. Other metals melt in the range of 200° C. to 250° C. are usable, if a high temperature exposure (150° C.) and a burn-in (approximately 80° C.) for the quality guarantee of a semiconductor are considered.

Second Embodiment

Figure 7:
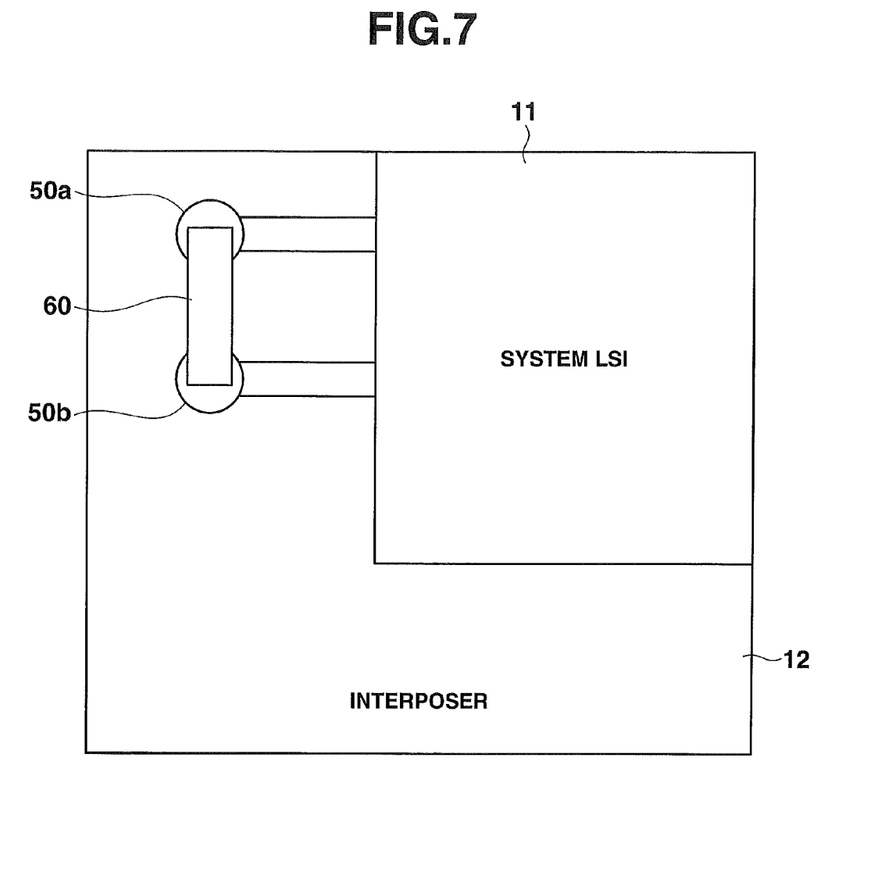
FIG. 7 is a diagram illustrating a disposal state of a short bar according to a second embodiment of the present invention.

In the first embodiment, the short bar 60 is formed in the surface portion of the system LSI_11 (refer to FIG. 4). In contrast, in the second embodiment, as illustrated in FIG. 7, the short bar 60 is formed in a package having the system LSI_11 and an interposer 12. In the case of forming the short bar 60 in the surface portion of the system LSI_11, since there is such a restriction that a congestion in the wiring on the surface portion occurs, it is difficult to dispose the program erasing trigger terminals 50*a* and 50*b* in the positions apart from each other. On the other hand, by forming the short bar 60 in the interposer 12, the positions of the program erasing trigger terminals 50*a* and 50*b* are freely set without being influenced by a congestion in the wiring which occurs on the surface portion of the system LSI_11. As a result, the degree of freedom in disposing the pattern of the program erasing trigger terminals 50*a* and 50*b* is increased, and the security effect is also improved. Moreover, since the configuration other than the above is substantially the same as that of the first embodiment, the description of the corresponding portions indicated by the same reference numerals is omitted.

As described above, the system LSI_11 of the second embodiment includes the program erasing circuit 40 for erasing the contents in the program memory and two program erasing trigger terminals 50*a* and 50*b* controlling the execution of the program erasing circuit 40. Further, in the system LSI_11 of the second embodiment, when a current is passed to the system LSI_11, after the system LSI_11 is detached from the PCB, the potential of the inputter 42 of the program erasing circuit 40 becomes 0 [mV]. Subsequently, the program erasing means erases the program memory. In such a manner, an illegal copying of a program stored in the system LSI_11 is prevented.

Having described and illustrated the principles of this application by reference to one or more preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

What is claimed is:

1. A system LSI that integrates, on a single semiconductor, a logic circuit, a CPU (Central Processing Unit), and a program memory storing a program of the CPU, the system LSI comprising:
   a program eraser that is executable to erase contents stored in the program memory, the program eraser having an inputter to control execution of the erasure of the contents;

at least two program erasing trigger terminals, one of the program erasing trigger terminals being connected to the inputter of the program eraser; and a short bar to short-circuit the program erasing trigger terminals, wherein the short-circuit of the program erasing trigger terminals by the short bar disables operation of the program eraser at a manufacturing stage of the system LSI;

wherein when the program erasing trigger terminals are not short-circuited and current is applied to the system LSI, a voltage at the inputter of the program eraser causes the program eraser execute a program erasing operation to erase the contents stored in the program memory;

wherein the short bar is formed of a material having a melting point such that the short bar is thermally cut by reflow, when the system LSI is mounted to a printed circuit board, thereby ending the short-circuit of the program erasing terminals provided by the short bar;

wherein by providing a pattern on the printed circuit board to short-circuit the program erasing trigger terminals, the short-circuit of the program erasing trigger terminals by the pattern disables operation of the program eraser while the system LSI remains mounted to the printed circuit board; and wherein the system LSI is configured such that upon detaching of the system LSI from the printed circuit board, the program erasing trigger terminals are no longer short-circuited, and when current is applied to the system LSI, the voltage at the inputter of the program eraser causes the program eraser to execute the program erasing operation to erase the contents stored in the program memory.

2. The system LSI according to claim 1, wherein one of the program erasing trigger terminals is set to a VDD potential in the system LSI, and another of the program erasing terminals is connected to a ground and the inputter of the program eraser in the system LSI.

3. The system LSI according to claim 1, wherein the program eraser does not execute the program erasing operation when the voltage at the inputter is a potential other than a ground, and executes the program erasing operation when the voltage at the inputter is the ground.

4. The system LSI according to claim 1, wherein an integration circuit disposed in the system LSI is assembled in the one of the program erasing trigger terminals.

5. The system LSI according to claim 1, wherein the system LSI is mounted in the form of a BGA (Ball Grid Array) package.

6. The system LSI according to claim 5, wherein the program erasing trigger terminals are set as terminals disposed in a region on an inside of a range surrounded by terminals in second rows from an outside in the BGA package.

7. A method comprising:
providing a system LSI integrating in a single semiconductor device a logic circuit, a CPU (Central Processing Unit) and the program memory to store a program of the CPU, the system LSI further comprising (i) a program eraser to execute erasing of contents stored in the program memory, the program eraser having an inputter to control the execution of the contents erasure, (ii) at least two program erasing trigger terminals, one of the program erasing terminals being connected to the inputter of the program eraser, and (iii) a short bar to short-circuit the two program erasing trigger terminals, wherein the short-circuit of the program erasing trigger terminals by the short bar disables operation of the program eraser, wherein when the program erasing trigger terminals are not short-circuited and current is applied to the system LSI, a voltage at the inputter of the program eraser causes the program eraser execute a program erasing operation to erase the contents stored in the program memory; and mounting the system LSI to a printed circuit board, wherein the short bar is formed of a material having a melting point such that the short bar is thermally cut by reflow when the system LSI is mounted to the printed circuit board, thereby ending the short-circuit of the program erasing terminals provided by the short bar, and wherein the printed circuit board has a pattern to short-circuit the program erasing trigger terminals, the short-circuit of the program erasing trigger terminals by the pattern disables operation of the program eraser while the system LSI remains mounted to the printed circuit board;

wherein when the system LSI is detached from the printed circuit board, the program erasing trigger terminals are no longer short-circuited, and when current is applied to the system LSI, the voltage at the inputter of the program eraser causes the program eraser to execute the program erasing operation to erase the contents stored in the program memory.

8. A printed circuit board having the system LSI according to claim 1 mounted thereon, the short bar of the system LSI having been thermally cut when the system LSI was mounted on the printed circuit board, and the printed circuit board comprising:

a pattern to short-circuit the program erasing trigger terminals of the system LSI mounted on the printed circuit board, such that operation of the program eraser is disabled;

wherein the system LSI is configured such that upon detaching of the system LSI from the printed circuit board, the program erasing trigger terminals are no longer short-circuited, and when current is applied to the system LSI, the voltage at the inputter of the program eraser causes the program eraser to execute the program erasing operation to erase the contents stored in the program memory.

* * * * *